United States Patent [19]

Murphy

[11] 4,050,914

[45] Sept. 27, 1977

[54] ACCELERATOR FOR CHARGED PARTICLES

[75] Inventor: David R. Murphy, Falls Church, Va.

[73] Assignee: S.A.E.S. Getters S.p.A., Milan, Italy

[21] Appl. No.: 708,645

[22] Filed: July 26, 1976

[51] Int. Cl.[2] ........................ B01D 53/04; F04B 37/02; H01J 43/28

[52] U.S. Cl. ........................................ 55/387; 55/521; 313/107; 417/51

[58] Field of Search .................... 55/66, 208, 387, 389, 55/514, 524, 521; 313/106, 107, 174, 359; 316/25; 417/48, 49, 50, 51

[56] References Cited

U.S. PATENT DOCUMENTS

| | | | |
|---|---|---|---|
| 2,762,941 | 9/1956 | Turner | 313/359 X |
| 2,955,229 | 10/1960 | Bondley | 313/107 X |
| 3,252,034 | 5/1966 | Priest et al. | 313/107 |
| 3,609,064 | 9/1971 | Giorgi et al. | 55/208 X |
| 3,620,645 | 11/1971 | della Porta et al. | 417/48 |
| 3,662,522 | 5/1972 | della Porta et al. | 55/387 |
| 3,761,761 | 9/1973 | Van Oostrom | 313/107 X |

*Primary Examiner*—Wilbur L. Bascomb, Jr.
*Assistant Examiner*—Robert H. Spitzer
*Attorney, Agent, or Firm*—Littlepage, Quaintance, Murphy, Richardson & Webner

[57] ABSTRACT

An accelerator for charged particles comprising: a vacuum tight chamber, means for producing a beam of particles, and means for inhibiting secondary emission. The means for inhibiting secondary emission comprises outwardly extending wedge-shaped members covering the inner walls of the vacuum chamber. The outwardly facing surfaces of the wedge-shaped members are covered with a nonevaporable getter metal.

3 Claims, 5 Drawing Figures

ACCELERATOR FOR CHARGED PARTICLES

Accelerators for charged particles are well known. Examples of presently known accelerators include among others, cyclotrons, betatrons, linear accelerators, synchrotons, and nuclear fusion machines of the Tokamak and/or Stellarator types. Accelerators for charged particles generally comprise a vacuum tight chamber defined by gas tight walls.

As the term accelerator is used herein, both in this specification and in the appended claims, it is intended to include all the means necessary for producing and/or maintaining a beam of particles. The means for maintaining a beam of particles will generally comprise a source of the charged particles and means for accelerating the particles such as a system of electrodes whose potential are known or a system of magnetic fields, but may in addition, comprise a means for storing the beam of accelerated particles. Both the acceleration of the particles and the storage of the particle beam are normally accomplished in a vacuum. However, individual particles can escape from the particle beam and can strike the walls of the vacuum tight chamber. Furthermore, the controlled beam of particles may collide with molecules or atoms of residual gas in the vacuum chamber producing ions and causing such ions to impinge upon the wall of the vacuum chamber. When such a particle or ion strikes the wall of the vacuum tight chamber, three possibilities exist. The first possibility is that the particle or ion will adhere to the wall. The second possibility is that the particle or ion will be reflected off the wall. The third possibility is that the particle or ion will be absorbed by the wall with the attendant release of one or more additional particles. Such release of one or more additional particles is generally termed secondary emission. If secondary emission becomes too great, particles released by the secondary emission build up in the chamber generally in the form of additional undesirable gas. The charged particles in the particle beam then collide with these additional gas particles lowering the beam intensity and producing even more ions which will produce even more undesirable gas, thus causing local increases in pressure so that a potentially unstable pressure avalanche is initiated.

It is therefore an object of the present invention to provide an improved accelerator for charged particles which is substantially free of the disadvantages of prior accelerators.

Another object is to provide an improved accelerator for charged particles which is substantially free of secondary emission.

A further object of the present invention is to provide an improved accelerator for charged particles which maintains a high degree of vacuum.

A still further object is to provide an improved accelerator for charged particles which can effect a longer lifetime for a stored beam of accelerated subatomic particles than prior accelerators.

Additional objects and advantages of the present invention will be apparent to those skilled in the art by reference to the following detailed description and drawings wherein.

Figure 1:
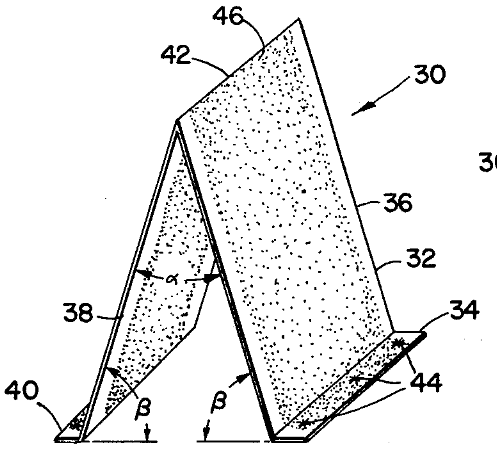
FIG. 1 is a perspective view of a wedge-shaped member useful in the present invention.

According to the present invention there is provided an accelerator for charged particles. The accelerator comprises a vacuum chamber, means for maintaining a beam of particles and means for inhibiting secondary emission. According to the present invention the means for inhibiting secondary emission comprises outwardly extending wedge-shaped members covering the inner surface of the walls of the vacuum chamber. The outwardly facing surfaces of the members are covered with a nonevaporable getter metal.

Particles that can be accelerated in accelerators of the present invention include all of those particles that could be accelerated in accelerators. Particles include among other, electrons, protons, alpha particles, deuterium ions, tritium ions, and in general ions of any other element.

The means useful in accelerators of the present invention for maintaining the particle beam include all such means presently known in the art. Generally, means for maintaining a particle beam comprise a source of the charged particle as well as a means for accelerating the particles. Accelerating means can comprise a system of electrodes maintaining a potential difference between the source of the particle and its target or a system of magnetic fields. Means for maintaining a particle beam may also comprise a means for storing the beam of accelerated particles depending on the particular use to which the beam is being put. For example, a synchrotron can be provided with one or more circular storage rings in which the accelerated particles are accumulated and constrained to travel. Often such storage rings will be larger than the accelerating means so that more secondary emission problems would be encountered in the storage means than in the accelerating means.

In the broadest aspects of the present invention any nonevaporable getter material can be employed such as titanium, zirconium, tantalum or niobium as well as alloys and/or mixtures of two or more of the above. The preferred nonevaporable getter material is an alloy of 5 to 30 weight percent aluminum, balance zirconium, and especially that alloy of 16 weight percent aluminum, balance zirconium, available as "St 101" from SAES Getters S.p.A., Milan, Italy. See U.S. Pat. No. 3,203,901.

The wedge-shaped members can be formed of any material but are preferably formed of a sheet metal strip. Sheet metal strips can be readily bent into wedge shapes and easily attached to the surfaces of the inner walls of the vacuum chamber by any means known in the art but preferably attachment is effected with spot welds or solder. The particulate coating of getter metal on one or both surfaces of the sheet metal strips can be accomplished by any means known in the art but preferably the particles of the coating are embedded in the sheet metal strip without substantial reduction of the surface area of the particles. This preferred type of coating can be accomplished in accordance with the method described in della Porta et al U.S. Pat. No. 3,652,317. Other U.S. patents relating to a strip having a getter metal coating include among others: U.S. Pat. Nos.

3,603,704; 3,609,062; 3,609,064; 3,620,645; 3,662,522; 3,780,501; 3,856,709; and 3,926,832.

The wedge-shaped members can be disposed on the surfaces of the inner walls in any arrangement in relation to each other but preferably the wedge-shaped members are disposed in alternating pairs, each pair consisting of two wedge-shaped members, each member covering a square area of the inner surface of the wall with a side of the square area equaling the width of the sheet metal strip. Each member of each pair is preferably perpendicular to the other member of its pair so that full benefit can be realized from the preferred getter metal coating of both sides of the sheet metal strips. This preferred arrangement of the wedge-shaped members on the wall used in conjunction with the preferred getter metal coating of both sides of the sheet metal strips results in a greater tapping efficiency of those particles contributing to secondary emission.

Figure 4:
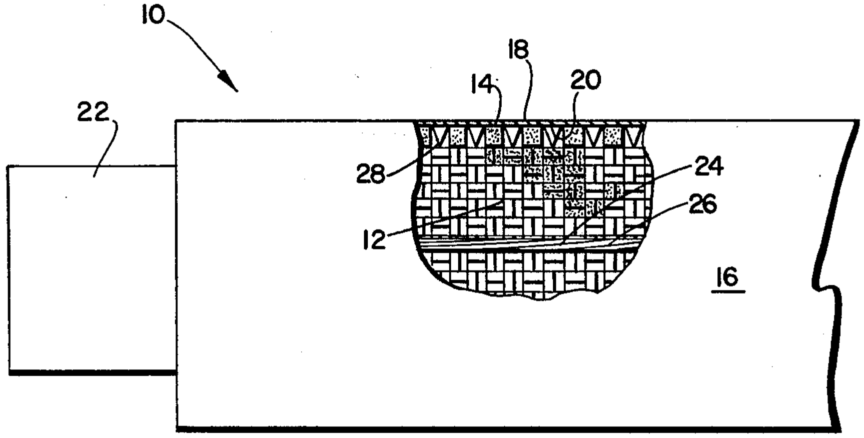
FIG. 4 is a partially cut away view of a section of a linear accelerator for charged particles of the present invention.

Referring now to the drawings and in particular to FIG. 4 there is shown an accelerator 10 of the present invention. The accelerator 10 comprises a vacuum chamber 12 defined by walls such as the walls 14, 16. The wall 14 has an outer surface 18 and an inner surface 20. The accelerator 10 is also provided with particle-beam-producing means 22 which produces a beam 24 of particles 26. In addition, accelerator 10 is provided with outwardly extending wedge-shaped members 28 which inhibit secondary emissions from all the inner surfaces, such as inner surface 20, of the walls of vacuum chamber 12.

An individual wedge-shaped member 30 is shown in FIG. 1 as comprising a sheet metal strip 32 which is longer than it is wide. The sheet metal strip 32 comprises a first wing 34, a first sheet metal segment 36, a second sheet metal segment 38, and a second wing 40. Both the first wing 34 and the second wing 40 are parallel to and attached to the inner surface of the wall of the vacuum enclosure by attachment means 44 which preferably comprises spot welds along the length of the first wing 34 and along the length of the second wing 40. The first sheet metal segment is attached to the first wing so as to form a dihedral angle $\beta$ between the first sheet metal segment and the inner surface of the wall, angle $\beta$ being less than 90°. The second sheet metal segment 38 is attached to the first sheet metal segment 36 along a dihedral edge 42 which is the edge of the first and second sheet metal segments furthest from the wall. A dihedral angle $\alpha$ is formed between the first sheet metal segment 36 and the second sheet metal segment 38, angle $\alpha$ being less than 90°, preferably less than 45°. The second sheet metal segment 38 is equal in length to the first sheet metal segment 36 so that the second sheet metal segment 38 also forms a dihedral angle $\beta$ with the inner surface of the wall. The second wing 40 is attached to the second sheet metal segment 38 where the second sheet metal segment reaches the inner surface of the wall.

As shown in FIG. 1 both sides of the sheet metal strip 32 are covered with a particulate coating 46 of a non-evaporable getter metal. The particulate coating 46 is a coating in which the particles of getter metal are embedded in the sheet metal strip 32 but without a substantial surface area reduction from that inherent in an equivalent amount of unembedded particles. The particles of coating 46 may consist of any nonevaporable getter metal, but the preferred getter metal is "St 101" or powdered titanium for high temperatures.

Figure 2:
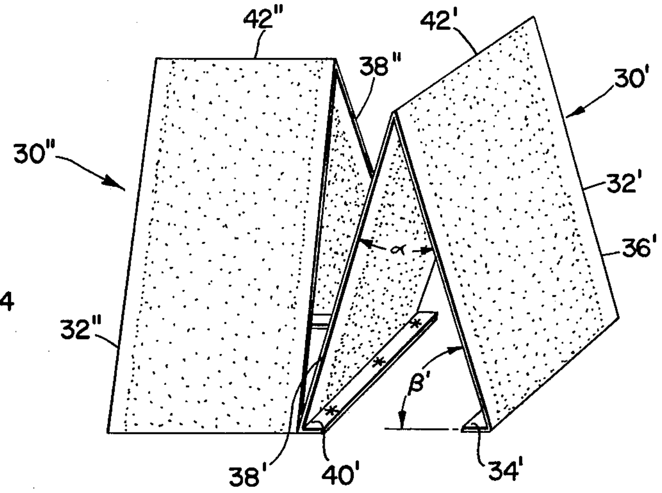
FIG. 2 is a perspective view of two wedge-shaped members of alternative construction which are useful in the present invention.

An alternate construction of the wedge-shaped members is shown in FIG. 2. Each of the wedge-shaped members shown, 30' and 30", is nearly identical to the construction of wedge-shaped member 30 of FIG. 1. The only difference between wedge-shaped member 30 and the wedge-shaped member 30' is that the first wing 34' and the second wing 40' extend toward each other rather than away from each other. This alternate construction allows wedge-shaped members such as 30' and 30" to be disposed on the inner surface of the wall in the arrangement shown in FIG. 2. In this arrangement the dihedral edge 42' of member 30' is perpendicular to the dihedral edge 42" of member 30". The area of the wall covered by each member 30' and 30" is a square whose sides are equal to the width of the sheet metal strip, 32' and 32", respectively. The members 30' and 30" are flush against each other at the wall so that the square area of the wall covered by the member 30' has one of its sides in common with one side of the square area of the wall covered by member 30".

Figure 3:
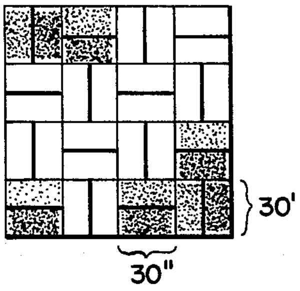
FIG. 3 is a plan view of wedged-shaped members in a preferred arrangement according to the present invention.

The overall arrangement is better shown in FIG. 3 which is a plan view of a portion of the inner surface of the walls of vacuum chamber 12. The arrangement is one of alternating pairs, each pair consisting of members such as 30' and 30". Each wedge-shaped member is perpendicular to each adjacent member, and each member is flush against each adjacent member at the inner surface of the wall so that the square area of the wall covered by each member has its sides in common with one side of the square area of the wall covered by each adjacent member.

Figure 5:
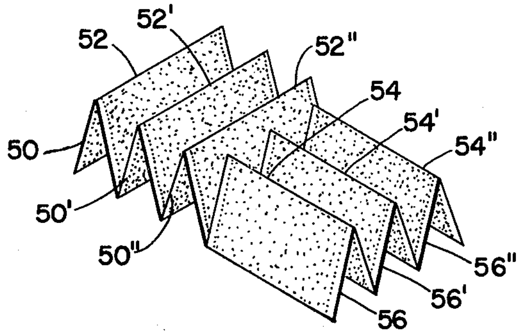
FIG. 5 is a perspective view of an alternative embodiment of the present invention.

In the embodiment shown in FIG. 5, a plurality of wedges 50, 50', 50" are arranged with their dihedral edges 52, 52', 52" parallel to one another but perpendicular to the dihedral edges 54, 54', 54" of the next adjacent set of wedges 56, 56', 56".

Although the invention has been described in considerable detail with reference to certain preferred embodiments thereof, it will be understood that variations and modifications can be effected within the spirit and scope of the invention as described above and as defined in the appended claims.

What is claimed is:

1. An accelerator for charged subatomic particles said accelerator comprising:

A. A vacuum chamber defined by gas-tight walls,

B. A means within said chamber for producing a beam of charged particles, and

C. A means for inhibiting secondary emissions said means comprising outwardly extending wedge-shaped members covering the inner surface of the walls of the vacuum chamber, each said member comprising:

1. a sheet metal strip, said sheet metal strip comprising:

a. a first wing parallel to and attached to the inner surface of the wall, b. a first sheet metal segment attached to the wing and extending outwardly from the wall, c. a second sheet metal segment attached to the edge of the first segment furthest from the wall, said second segment being equal in length to and forming a dihedral angle of less than 90° with the first segment, and d. a second wing attached to the second segment, said second wing being parallel to and attached to the inner surface of the wall, and 2. a coating on both sides of the sheet metal strip, said coating consisting of particles of a nonevaporable getter metal embedded in the sheet metal strip without substantial reduction of the surface area of said particles, and
3. a means for attaching the sheet metal strip to the inner surface of the wall of the vacuum chamber, said means comprising spot welds attaching the first and second wings to the inner surface of the wall wherein the first and second wings of the sheet metal strip extend toward each other, the first wing forming a dihedral angle of less than 90° with the first segment and the second wing forming a dihedral angle of less than 90° with the second segment.

2. An accelerator for charged subatomic particles said accelerator comprising:

A. A vacuum chamber defined by gas-tight walls,

B. A means within said chamber for producing a beam of charged particles, and

C. A means for inhibiting secondary emissions said means comprising outwardly extending wedge-shaped members covering the inner surface of the walls of the vacuum chamber, each said member comprising:

1. a sheet metal strip, said sheet metal strip comprising.
   a. a first wing parallel to and attached to the inner surface of the wall,
   b. a first sheet metal segment attached to the wing and extending outwardly from the wall,
   c. a second sheet metal segment attached to the edge of the first segment furthest from the wall, said second segment being equal in length to and forming a dihedral angle of less than 90° with the first segment, and
   d. a second wing attached to the second segment, said second wing being parallel to and attached to the inner surface of the wall, and
2. a coating on both sides of the sheet metal strip, said coating consisting of particles of a nonevaporable getter metal embedded in the sheet metal strip without substantial reduction of the surface area of said particles, and
3. a means for attaching the sheet metal strip to the inner surface of the wall of the vacuum chamber, said means comprising spot welds attaching the first and second wings to the inner surface of the wall wherein the wedge-shaped members are arranged on the inner surface of the walls of the vacuum chamber in alternating pairs, each member of each pair being disposed on the inner surface so that a dihedral edge formed by its first and second sheet metal segments is perpendicular to a dihedral edge formed by the first and second sheet metal segments of the other member of the pair, an area of the wall covered by each member of each pair being a square whose sides are equal to the width of the sheet metal strip, the square area of the wall covered by each member of each pair having each of its sides in common with one side of the square area of the wall covered by each adjacent member.

3. An accelerator for charged particles, said said accelerator comprising:

A. A vacuum chamber defined by gas-tight walls,

B. A means within said chamber for producing a beam of charged particles, said means comprising outwardly extending wedge-shaped members covering the inner surface of the walls of the vacuum chamber, each said member comprising:

1. a sheet metal strip longer than it is wide, said sheet metal strip comprising:
   a. a first wing parallel to and attached to the inner surface of the walls of the vacuum chamber,
   b. a first sheet metal segment attached to the first wing, said first segment forming a dihedral angle of less than 90° with the first wing,
   c. a second sheet metal segment attached to the edge of the first segment furthest from the wall, said second segment being equal in length to and forming a dihedral angle of less than 45° with the first segment, said second segment extending from the first segment so as to reach the wall, and
   d. a second wing attached to the second segment, said second wing extending toward the first wing and being parallel to and attached to the inner surface of the wall,
2. a coating on both sides of the sheet metal strip, said coating consisting of particles of a nonevaporable getter metal,
   a. said getter metal consisting of an alloy of 16 weight percent aluminum balance zirconium,
   b. said particles being embedded in the sheet metal strip without substantial reduction of the surface area of said particles,
3. a means for attaching the sheet metal to the inner surface of the walls of the vacuum chamber, said means comprising:
   a. spot welds along the length of the first wing and
   b. spot welds along the length of the second wing wherein the wedge-shaped members are arranged on the inner surface of the walls of the vacuum chamber in alternating pairs, each member of each pair being disposed on the inner surface so that a dihedral edge formed by its first and second sheet metal segments is perpendicular to a dihedral edge formed by the first and second sheet metal segments of the other member of the pair, an area of the wall covered by each member of each pair being a square whose sides are equal to the width of the sheet metal strip, the square area of the wall covered by each member of each pair having each of its sides in common with one side of the square area of the wall covered by each adjacent member.

* * * * *